RED $V_0$

YELLOW $V_0$

BLUE $V_0$

United States Patent Office 3,443,196
Patented May 6, 1969

3,443,196
STATIC INVERTER WITH PULSE-WIDTH MODULATION REGULATION
Terence P. Horner, Ilford, Essex, England, assignor to The Plessey Company Limited, Ilford, England, a British company
Filed Jan. 23, 1967, Ser. No. 611,153
Claims priority, application Great Britain, Feb. 9, 1966, 5,775/66
Int. Cl. H02m 7/04, 1/12
U.S. Cl. 321—5                          9 Claims

ABSTRACT OF THE DISCLOSURE

A regulated static inverter arrangement wherein a regulated output waveform is provided by thyristors which are conduction controlled with triggering pulses derived from a master oscillator by a gating system, the phase relationship between the triggering pulses being such that no third harmonics are present in the output waveform and wherein regulation is achieved by pulse width control of certain trigger pulses in dependence upon the energy content of the output waveform.

---

This invention relates to regulated static inverters.

The purpose of an inverter is to produce from a D.C. supply an A.C. voltage which may be sinusoidal and which may be single phase or three-phase. It is desirable that the A.C. output of such an inverter having a sinusoidal output voltage remains substantially constant with reasonable load variations and it is also desirable that the sinusoidal output should be free from distortion, particularly third harmonic distortion. The use of transistors requires at least one stage of amplification to drive an output stage to provide adequate power and with the transistors presently available the maximum current output possible is somewhat limited. By reference hereinafter to "switching device" is meant any device, such as silicon-controlled rectifiers, having triggering means to which trigger signals may be applied to switch the device "on" and in which the device is switched "off" by reducing the voltage across it to a predetermined value.

According to the invention there is provided in or for a regulated static inverter arrangement means for producing separate series of square waveform signals having the same repetition frequency, with the signals of any one series being phase displaced from corresponding signals of the other series, means for gating the signals of separate series with gating signals to provide trigger signals which are applied to switching devices, and means for injecting further trigger signals to such switching devices thereby to provide an output signal with substantially no third harmonic content in which regulation of the energy content of said output signal is achieved in accordance with the duration of said gating signals, the said density being determined in dependence upon the instant at which they are initiated.

The means for providing separate square-wave series may comprise a master oscillator, a pulse output from which is applied to a ring counter to produce separate square-wave series at one-sixth of the master oscillator frequency and in fixed phase relationship with it. Square-wave series thus produced are applied to the means for gating the signals of separate series, said gating means conveniently comprising "AND" gates to which the gating signals and the series are fed, outputs from the "AND" gates being utilised to trigger the switching devices.

Gating signals for gating the separate series applied to the "AND" gates may be derived from a further output from the master oscillator and comprise square-waves the instant of initiation or in other words the leading edge of said square-waves being delayed from the master oscillator output in accordance with regulation of the energy content of said harmonic free output signal.

The means for injecting further trigger signals to the switching devices may comprise differentiators, which differentiate the leading edge of said separate square-wave series, thereby to provide pulses in fixed phase relationship with the master oscillator to re-introduce the leading edge of said separate square-wave series, and so provide in combination with the "AND" gate outputs a complete trigger signal sequence to trigger the switching devices thereby to provide an output signal substantially free from third harmonics wherein regulation of the output signal is achieved by variation of the instant of initiation of said gating signals.

Variation of the instant of initiation of said gating signals may be achieved by generating such signals with a Schmitt trigger circuit to which is applied the further output from the master oscillator which may be a saw-tooth ramp waveform, the Schmitt trigger being arranged to fire at a predetermined point on the ramp, the start of which is in phase synchronism with the master oscilator.

Automatic regulation is achieved by controlling the instant of initiation of the gating signal in dependence upon an output voltage from the switching device so that a voltage decrease in the output due to an increase in load current may be compensated for automatically.

In one particular arrangement of a regulated three-phase static inverter embodying the invention six separate series of square waveform signals are provided by the ring counter at one-sixth of the master oscillator frequency and each series is related to its neighbour by 60°. The six signal series are applied to separate "AND" gates having gating signal inputs supplied by a Schmitt trigger circuit which is triggered by a saw-tooth ramp waveform derived from the master oscillator, the trigger signal outputs from the "AND" gates being utilised together with further trigger signals derived by differentiating the leading edge of separate series to fire six switching devices connected to define a bridge circuit and providing a three-phase output signal substantially free from third harmonics wherein automatic regulation of said output signal is achieved by controlling the firing point of the Schmitt trigger in dependence upon the output voltage from the switching device. The said trigger signals from the "AND" gates and the said further trigger signals may conveniently be applied to "OR" gates the outputs of which are utilised to fire the six switching devices which are connected to define a bridge circuit. The output voltage from the bridge may be suitably filtered to provide a sinusoidal output.

Some exemplary embodiments of the invention will now be described with reference to the accompanying drawings in which.

Figure 1:
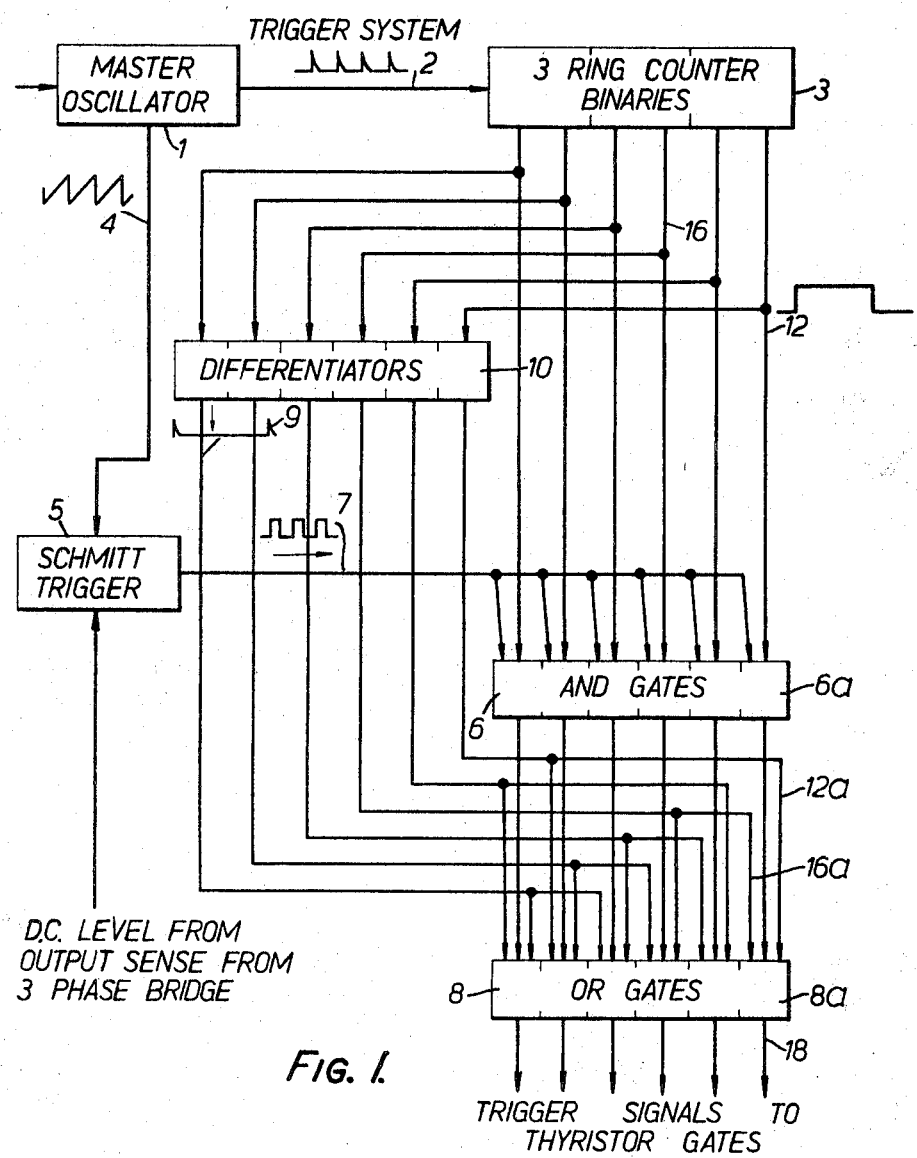
FIGURE 1 is a block schematic diagram of a trigger signal generating system for triggering a three-phase regulated inverter bridge utilising silicon controlled rectifiers as switching devices.

Referring now to FIGURE 1 a 2.4 kc./s. master oscillator 1 provides output pulses 2 which are applied to a ring counter 3, while a further output from the oscillator 1 takes the form of a ramp waveform 4 which is applied to a Schmitt trigger circuit 5. The ring counter 3 which may comprise bistable switching circuits provides at its output six square-wave series at one-sixth of the master oscillator frequency, that is to say 400 cycles per second in this example, the square-wave series being phase related to their respective neighbours by 60°, and applied to six separate "AND" gates 6. The Schmitt trigger circuit 5 is arranged to fire at a predetermined point on the ramp waveform 4 to produce a square gating waveform 7 which is applied to each of the "AND" gates 6, to gate the separate square-wave series applied thereto. The separate outputs of the "AND" gates 6 are applied to six "OR" gates 8 together with trigger pulses 9 which are derived from the six separate square-wave series from the ring counter output by differentiators 10 which differentiate the leading edges of each pulse of the square-wave series. Each "OR" gate 8 has three inputs one of which consists of the gated square-wave series from a particular AND gate 6, another of which consists of differentiated pulses derived by differentiators 10 from the leading edge of the same square-wave series and yet another of which consists of additional differentiated pulses derived by differentiator 10 from that square-wave series which is phase advanced from the appertaining gated square-wave series by 120°.

The six "OR" gates 8, provide at their outputs predetermined trigger signal sequences for triggering respective silicon controlled rectifiers connected to define a three-phase inverter bridge in which regulation of the output energy from the bridge is achieved by predetermined selection of the point on the ramp signal 4 at which the Schmitt trigger 5 fires thereby delaying the leading edge of gating waveform 7 and changing its mark/space ratio accordingly.

Figure 2:
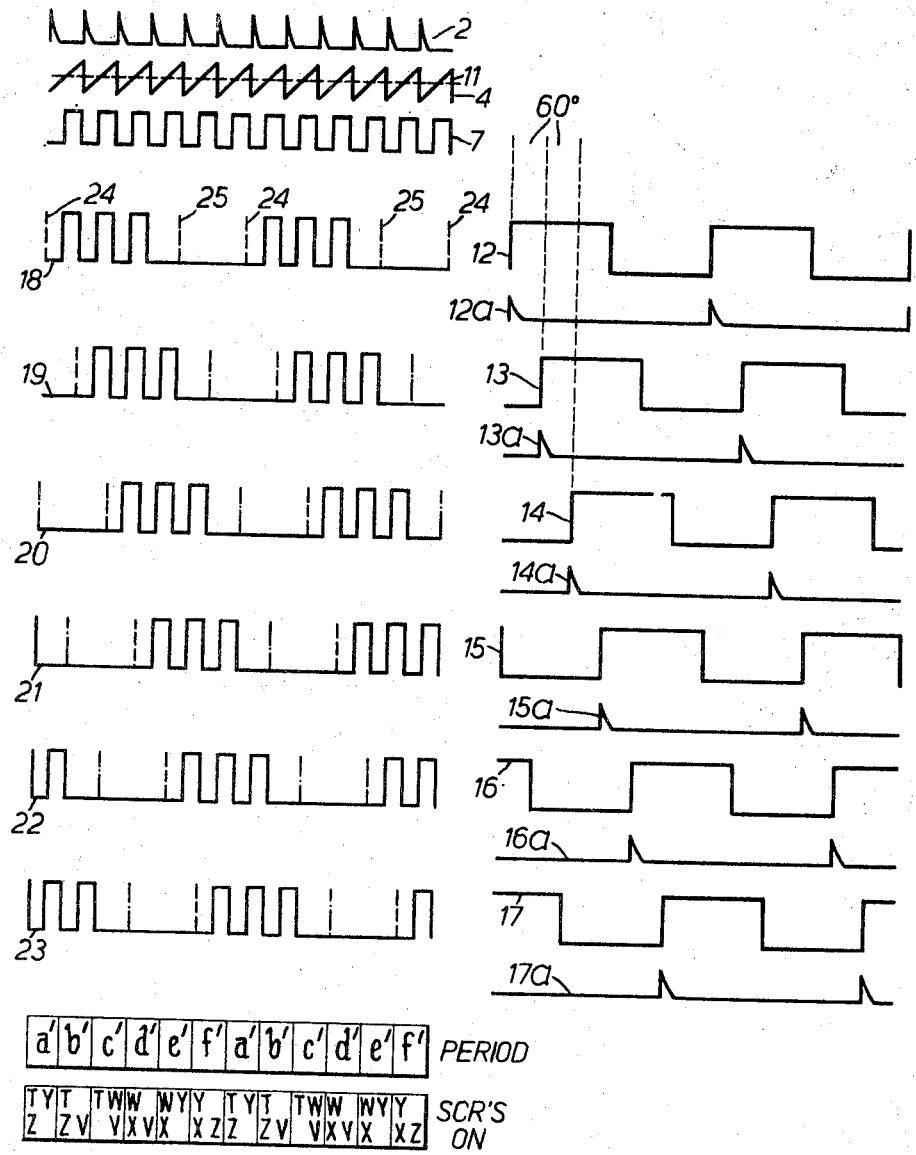
FIGURE 2 is a waveform diagram showing the waveforms present at various points during operation of the trigger signal generating system of FIGURE 1.

The waveforms of FIGURE 2 show the waveforms present at various points in the block schematic diagram of FIGURE 1. The master oscillator output pulses 2, the master oscillator ramp output 4, and the gating waveform 7 are shown in their respective places in FIGURE 1 but the arrangement of these waveforms in FIGURE 2 shows clearly the phase relationship between them. The start of the ramp waveform 4 is synchronised with the pulse output 2 and the dashed line 11 shows the predetermined firing level of the Schmitt trigger circuit 5. The leading edge of the gating waveform 7 can be seen to be in synchronism with the point of the predetermined firing level on the ramp waveform 4. Square-waves 12 to 17 inclusive are the six separate waveform series each series being phase related to its neighbour by 60° and the differentiated pulses derived from each of the square-waves are shown by waveform 12a to 17a inclusive. The six separate trigger signal sequences provided at the output of the "OR" gates are shown by waveforms 18 to 23 inclusive.

To take one example of the build-up of these waveforms 18 to 23 let it be assumed that the square-wave series 12 is applied to the right-hand "AND" gate 6a in FIGURE 1 and is gated with the gating waveform 7 to produce at the output of the "AND" gate concerned the waveform 18 without pulses represented by vertical dash and chain lines on this waveform 18 of FIGURE 2. This waveform is then applied to the right hand "OR" gate 8a. Also applied to the gate 8a are pulses 12a and 16a provided, respectively, by two of the differentiators 10, the pulses 16a being derived from the square-wave series 16 which is 120° in advance of square-wave series 12, from which the pulses 12a are derived. The output from the "OR" gate 8a thus comprises the waveform 12 gated by the waveform 7, the pulses 12a which represent the leading edge of waveform 12 and are shown as the dotted lines 24 on waveform 18 and the additional trigger pulses 16a on waveform 18 shown by chain-lines 25.

Each of the "OR" gate outputs 18 to 23 inclusive is similarly produced. The three-phase bridge of FIGURE 3 includes six silicon controlled rectifiers 18T, 19V, 20W, 21X, 22Y and 23Z to which the corresponding trigger signal sequences 18 to 23 are applied, to produce the resulting three-phase output from the bridge shown in FIGURE 4. The three-phase output voltage waveforms are those seen across each phase of the three phases and are designated red $V_o$, yellow $V_o$ and blue $V_o$ of the bridge. So that the phase relationship between triggering signals and the three-phase output signals can be readily seen, boxes $a'$ through $f'$ are shown in FIGURE 4 and FIGURE 2 and each box represents the same triggering period in respective figures. The reason for the additional pulses depicted by dotted and chain lines 24 and 25 on waveform 18 of FIGURE 2 will now be apparent. The silicon controlled rectifiers, by reason of their characteristics will only turn "OFF" if the voltage across them is substantially reduced and this is achieved by pulsing one silicon controlled rectifier in order to make it conduct to discharge a capacitor thereby removing the voltage across a second silicon controlled rectifier which it is desired to turn "OFF."

Figure 3:
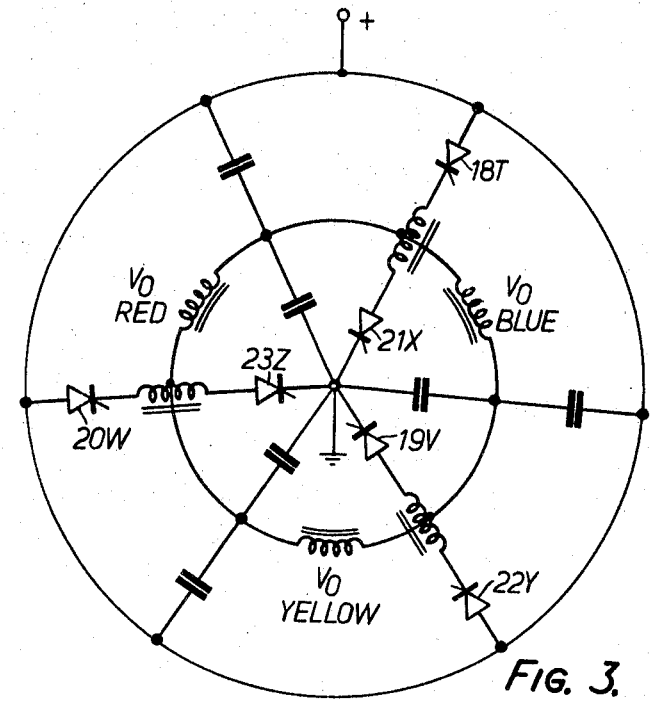
FIGURE 3 is a circuit diagram of a three-phase regulated inverter bridge utilising silicon controlled rectifiers as switching devices.
Figure 4:
FIGURE 4 is a waveform diagram showing the waveforms at the outputs of the three-phase regulated inverter bridge in relation to the waveforms of FIGURE 2; and, FIGURE 5 shows six circuit diagrams, which in combination, illustrate the conduction sequence of the silicon controlled rectifiers of the bridge circuit of FIGURE 3.
Figure 4:
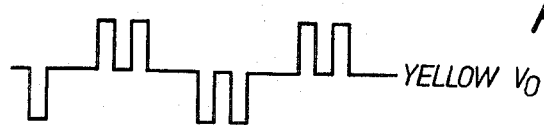
Figure 4:
Figure 5:
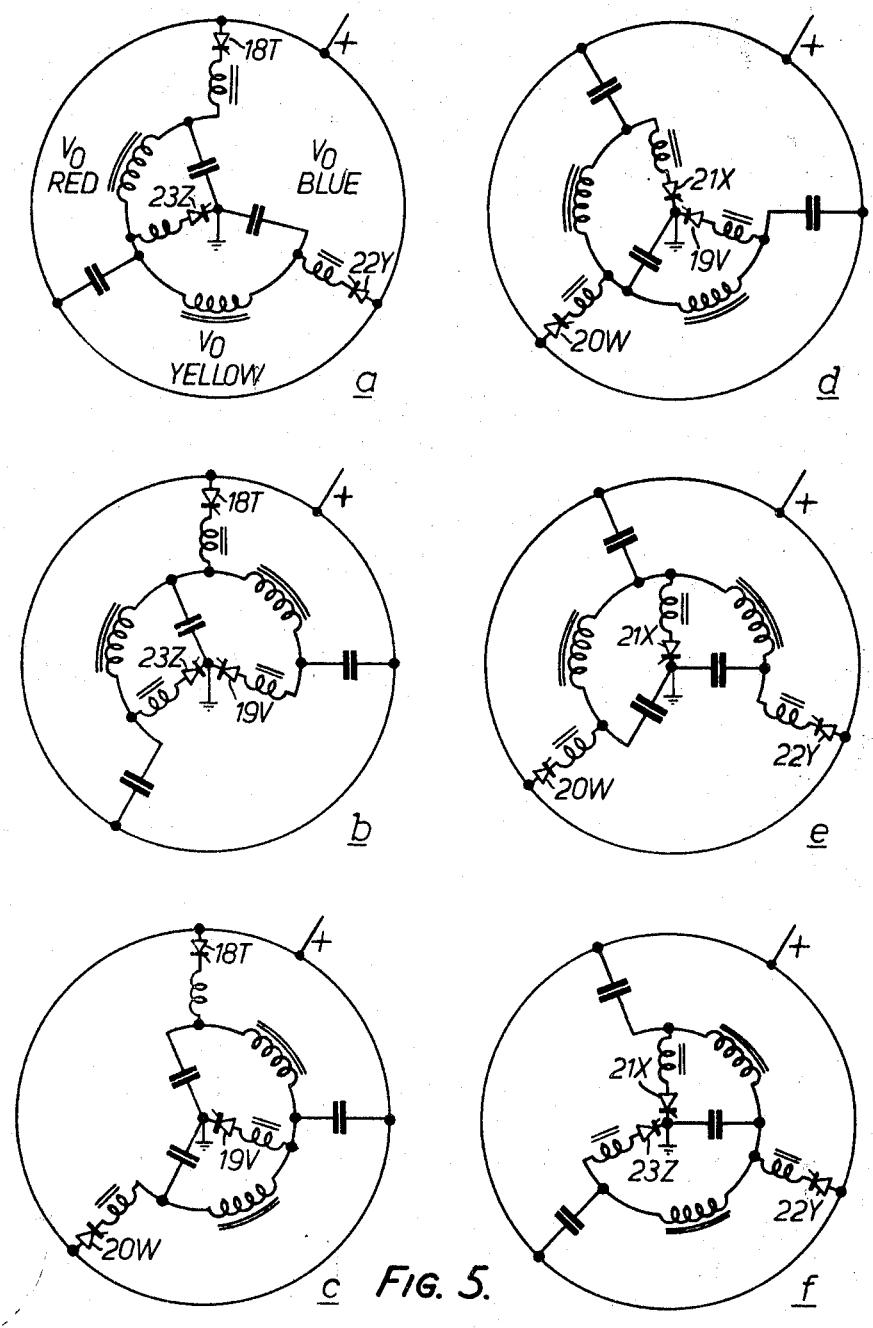

In order to make quite clear the conduction sequence of the silicon controlled rectifiers of the bridge circuit, those of the circuit components shown in FIGURE 3 which are active during six consecutive periods defining an output cycle are shown in FIGURE 5 and make up six circuit diagrams designated $a$ to $f$ respectively, which illustrate the effective circuitry during triggering periods in one complete output cycle. The triggering periods corresponding to the circuit diagrams $a$ to $f$ are shown in the boxes marked $a'$ to $f'$ in FIGURE 4 and FIGURE 2 and the silicon controlled rectifiers which are "on" during these triggering periods are indicated in the table below the period table by their suffix letters T to Z.

Thus it will be apparent that by applying the waveforms 18 to 23 to the corresponding silicon controlled rectifiers 18T to 23Z a three-phase output from the circuit of FIGURE 3 will result, the resulting separate phase waveforms of which will correspond to those of FIGURE 4. Automatic regulation of the three-phase inverter as just before described is achieved by controlling the firing level 11 of the Schmitt trigger circuit 5 in dependence upon the output from the inverter. Although not shown in the drawings, this is achieved by sensing the output voltage and converting it to a D.C. level. The D.C. level representing the firing level 11 of the Schmitt trigger. In this way, by adjusting the mark/space ratio of the gating waveform 7, the energy of the output is correspondingly adjusted so that the drop in output is accompanied by a corresponding drop in the triggering level 11 thereby to cause a compensating change in the mark/space ratio of the gating waveform 7.

Although not mentioned in the foregoing description the three-phase output square-waves from the bridge are normally filtered to provide a sinusoidal output which, by virtue of the shape of the square-wave input to the filter, is substantially free of third harmonics. The degree of freedom from third harmonics is dependent upon the 60° phase relationship of the square waveform series 12 to 17 inclusive and small deviations from the optimum 60° phase relationship will mean a corresponding introduction of third harmonics.

It will be apparent that although the "OR" gates 8 are desirable they are not essential to the operation of the triggering circuitry and may conceivably be omitted from the arrangement. It will also be apparent from the definition of the term switching device that this term will include thyristors, thyratrons and the like.

I claim:
1. A regulated static inverter arrangement comprising a master oscillator, means for producing separate series of square waveform signals each having the same repetition frequency which is a sub-multiple of the master oscillator frequency, gating means for gating the signals of said separate series with gating signals derived from said master oscillator so as to modulate said separate series at the master oscillator frequency, switching devices to which the modulated separate series, which constitute trigger pulse trains are applied, one trigger pulse train to each switching device, means for delaying the leading edge of said gating signals in dependence upon the energy of an output waveform from the switching devices thereby to achieve pulse width modulation regulations of said output waveform and means for deriving further trigger pulses from said separate series, said further trigger pulses being applied to said switching devices, the signals of any one of said series being phase displaced from corresponding signals of the other series such that the said output waveform is substantially third harmonic free.

2. A regulated static inverter arrangement as claimed in claim 1, wherein the means for providing the separate series of square waveform signals comprises a ring counter to which a pulse output from the master oscillator is applied so as to produce said separate series at one-sixth of the master oscillator frequency and in fixed phased relationship with it.

3. A regulated static inverter arrangement as claimed in claim 2, wherein said gating means comprises AND gates to which the gating signals and the said series are fed.

4. A regulated static inverter as claimed in claim 3, wherein the means for deriving further trigger pulses for said switching devices comprises differentiators which differentiate the leading edge of said separate square wave series thereby to provide pulses in fixed phase relationship with the master oscillator to re-introduce the leading edge of the said separate square wave series and so provide in combination with the AND gate outputs a complete trigger signal sequence to trigger the switching devices so as to provide the output waveform.

5. A regulated static inverter arrangement as claimed in claim 4, wherein variation of the instant of initiation of said gating signals is achieved by generating such signals with a Schmitt trigger circuit to which is applied a further output from the master oscillator said further output being a ramp waveform, the Schmitt trigger being arranged to fire at a predetermined point on the ramp the start of which is in phase synchronism with the master oscillator.

6. A regulated static inverter as claimed in claim 5, wherein six separate series of square waveform signals are provided by the ring counter at one-sixth of the master oscillator frequency each of said series being phase related to its neighbor by 60°.

7. A regulated static inverter as claimed in claim 6, wherein the said six separate series are applied to separate AND gates having gating signal inputs supplied by a Schmitt trigger circuit which is triggered by sawtooth ramp waveform derived from the master oscillator, the trigger signal outputs from the AND gates being utilized together with further trigger signals derived by differentiating the leading edge of said separate series to fire six switching devices connected to define a bridge circuit and providing a three-phase output signal substantially free from third harmonics, wherein regulation of said output signal is achieved by controlling the firing point of the Schmitt trigger in dependence upon an output voltage from the switching devices.

8. A regulated static inverter arrangement as claimed in claim 7, wherein the trigger signals from the AND gates and the said further trigger signals are applied to OR gates the outputs of which are utilized to fire the six switching devices which are connected to define a bridge circuit.

9. A regulated static inverter arrangement as claimed in claim 8, wherein the output signal is filtered to provide a sinusoidal output voltage.

References Cited

UNITED STATES PATENTS

| | | | |
|---|---|---|---|
| 3,215,860 | 11/1965 | Neuman | 328—27 X |
| 3,241,033 | 3/1966 | Peaslee et al. | 321—5 |
| 3,241,038 | 3/1966 | Amato | 321—9 X |
| 3,321,693 | 5/1967 | Heinrich et al. | 321—5 |
| 3,324,374 | 6/1967 | Corey | 321—5 |

LEE T. HIX, *Primary Examiner.*

W. H. BEHA, JR., *Assistant Examiner.*

U.S. Cl. X.R.

321—9; 328—27